J. F. KELLER.
DIRIGIBLE HEADLIGHT.
APPLICATION FILED AUG. 17, 1921.

1,415,243. Patented May 9, 1922.

Inventor
J. F. Keller
By D. Swift
Attorney

UNITED STATES PATENT OFFICE.

JOHN FRANKLIN KELLER, OF PEARL, ILLINOIS, ASSIGNOR TO CHRIS F. ANDERSEN AND J. R. MITCHELL, OF JACKSONVILLE, ILLINOIS.

DIRIGIBLE HEADLIGHT.

1,415,243.    Specification of Letters Patent.    Patented May 9, 1922.

Application filed August 17, 1921. Serial No. 492,971.

*To all whom it may concern:*

Be it known that I, JOHN FRANKLIN KELLER, a citizen of the United States, residing at Pearl, in the county of Pike, State of Illinois, have invented new and useful Dirigible Headlights; and I do hereby declare the following to be a full, clear, and exact description of the invention, such as will enable others skilled in the art to which it appertains to make and use the same.

The invention relates to dirigible headlights for motor driven vehicles, and has for its object to provide a device of this character so constructed that when the vehicle to which it is applied turns to the right or left, the lamps will turn in the same direction thereby reflecting light on the roadbed ahead of the vehicle during a turning operation. Also to provide a vertically disposed pivoted lever pivoted to the side of the vehicle and centrally of the lever, said lever having an operating connection with one of the wheel spindles, a rod connection with one of the lamp posts, said rod connections with the vertically disposed lever being a loose one, thereby allowing play incident to vibration and preventing constant movement of the lights incident to moving over a rough road. Also to provide spring means for normally holding the lights in central position and for assisting in returning the lights to a normal position after a turning operation.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1:
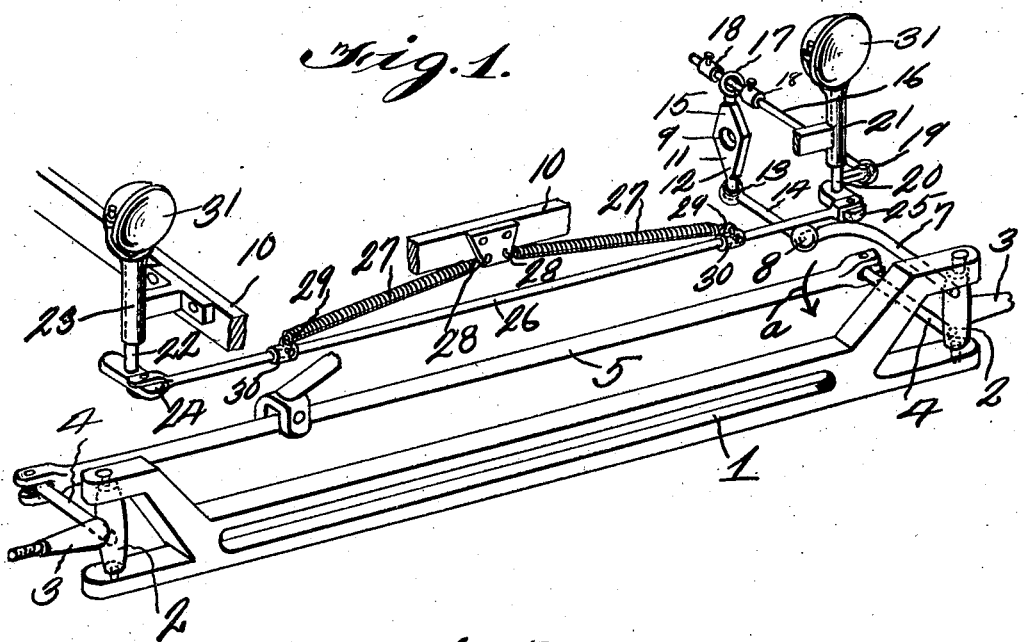
Figure 1 is a perspective view of the dirigible headlights and the forward running gear of a conventional form of automobile.
Figure 2:
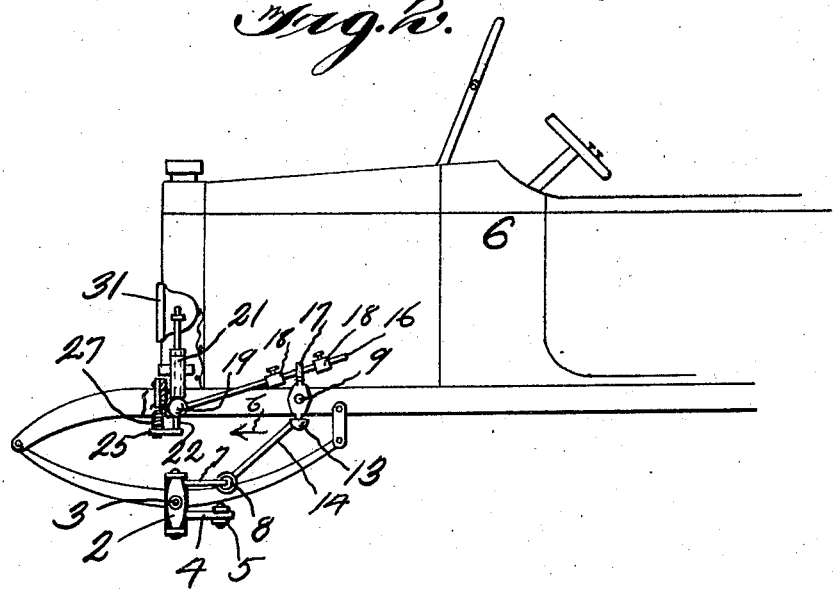
Figure 2 is a side elevation of the front end of an automobile, showing the headlight mechanism applied thereto.
Figure 3:
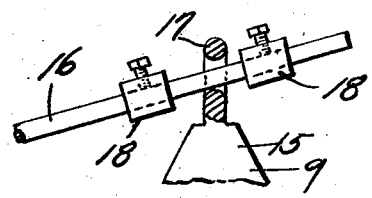
Figure 3 is a detail sectional view through the upper end of the vertically disposed lever, showing the loose connecting rod connection thereto.

Referring to the drawings, the numeral 1 designates the front axle of a conventional form of automobile, and 2 the spindles which are pivotally mounted in the ends thereof and adapted to receive wheels on their stubs 3. Extending rearwardly from the spindles 2 are spindle arms 4, which arms are connected together by means of a connecting rod 5, the ends of which are pivotally connected to the rear ends of the arms 4. The connecting rod 5 is moved transversely by any suitable steering mechanism carried by the automobile 6 for simultaneously moving the stubs 3 and the wheels carried thereby. Extending rearwardly and curving inwardly from one of the spindles 2 is a lamp operating arm 7, said arm terminating in a universal joint 8. Pivoted as at 9 to one side of the vehicle frame 10 is a rockable lever 11, the arm 12 of the lever 11 has connected thereto by means of the universal joint 13, a connecting rod 14, the forward end of said connecting rod being universally connected to the arm 7 by means of the universal joint 8. It will be seen that by providing the universal joints 8 and 13 that as the arm 7 moves in the direction of the arrow *a*, a forward pull will be imparted to the arm 12 of the lever 11 in the direction of the arrow *b*. When the arm 12 moves forwardly in the direction of the arrow *b*, the arm 15 moves rearwardly, thereby pulling rearwardly on a connecting link 16, which link extends through an eye 17 in the lever 11 and is provided with adjustable stops 18, between which stops the eye 17 plays under ordinary vibrations incident to the vehicle moving over the road and with which stop the eye engages during a vehicle turning operation for imparting a pull or push on the connecting rod 16, the forward end of which is universally connected at 19 to the lamp post 20, said lamp post being pivotally mounted in a bracket 21. A second lamp post 22 is vertically mounted in a lamp bracket 23 on the other side of the vehicle frame 10 and is provided with a forwardly extending arm 24, which arm is connected to a forwardly extending arm 25 carried by the lamp post 20 by means of a connecting rod 26.

To maintain the lamps in position and against vibration on account of the loose connection between the arm 15 of the lever 11 and the connecting rod 16 it is necessary to provide coiled springs 27 which coil springs have their adjacent ends connected at 28 to the front of the frame 10 of the vehicle and have their outer ends connected at 29 to adjustable collars 30 longitudinally movable and adjustable on the connecting rod 26. It will be seen that by adjusting the collars 30 that the tension of the springs 29 may be so regulated that when the vehicle is going in a straight course, the lamp posts 22 will be held against movement and consequently the lamps 31 maintained in normal position for reflecting the light upon the roadbed in front of the vehicle.

From the above it will be seen that a dirigible headlight mechanism is provided which is so constructed that during a vehicle steering operation the lamps will not be moved on minor movements of the steering wheels and upon a turning of the vehicle the lamps will be turned automatically for projecting the light upon the roadbed forwardly of the vehicle no matter whether the vehicle turns to the right or the left.

The invention having been set forth what is claimed as new and useful is;

1. A dirigible headlight mechanism for automobiles comprising a vertically pivoted lamp bracket, the lower end of said bracket having a transversely disposed outwardly extending arm, a lever pivoted to the side of the automobile, said lever being pivoted at a central point thereby forming an upwardly and downwardly extending arm, an eye carried by the end of an upwardly extending arm, a connecting rod extending through said eye and provided with stops located on each side of the eye, the forward end of said connecting rod being universally connected to the outwardly extending arm the pivotal points of said connecting rod being universal ones, said rearwardly and inwardly extending arm carried by the axle spindle of the automobile, a connecting link universally connected to and extending rearwardly from said rearwardly and inwardly extending arm, the rear end of said last named connecting link being connected to the downwardly extending arm of the pivoted lever by means of a universal joint.

2. The combination with a dirigible headlight mechanism for automobiles, said mechanism comprising pivoted lamp posts having forwardly extending arms connected together by a connecting rod, of means for normally maintaining said lamp posts and their arms in longitudinal relation with the automobile, said means comprising springs connected to the automobile and extending outwardly and downwardly, collars adjustably mounted on the connecting rod, said springs having their outer ends connected to said collars, and forming means for maintaining the connecting rod in central position in relation to the automobile.

In testimony whereof I have signed my name to this specification in the presence of two subscribing witnesses.

JOHN FRANKLIN KELLER.

Witnesses:
LYDIA LUCAS,
F. M. THURMAN.